United States Patent [19]

Hinks

[11] 3,810,159

[45] May 7, 1974

[54] APPARATUS AND METHOD TO EFFECT IR READING OF A RELIEF PATTERN

[75] Inventor: William L. Hinks, Akron, Ohio

[73] Assignee: The Goodyear Tire & Rubber Company, Akron, Ohio

[22] Filed: Apr. 3, 1972

[21] Appl. No.: 240,620

[52] U.S. Cl. .... 340/146.3 R, 152/330, 235/61.11 E, 250/271, 250/338, 340/146.3 B

[51] Int. Cl. .......... G06k 9/00

[58] Field of Search .... 250/219 Q, 83.3 H, 219 CR, 250/338, 340, 341, 342, 358, 360, 271; 340/146.3 K, 146.3 R; 152/330; 235/61.11 E; 263/3; 73/351; 219/201, 202

[56] References Cited

UNITED STATES PATENTS 3,517,166 6/1970 Shlesinger .......... 235/61.11 E 3,573,472 4/1971 Madalo .......... 340/146.3 MA

*Primary Examiner*—Paul J. Henon

*Assistant Examiner*—Leo H. Boudreau

*Attorney, Agent, or Firm*—F. W. Brunner; L. A. Germain

[57] ABSTRACT

Reading of an identification pattern in relief to the surface area of a material is accomplished by creating a temperature difference between raised and recessed portions of the pattern. Either heating or cooling the inclosed area of the pattern by conduction provides emitted infrared radiation having energy levels indicative of the temperature of the raised and recessed areas. The radiation energy is detected by IR sensors that convert the radiation to electrical signals indicative of the relief pattern in the material. Output apparatus converts the sensor signals to an equivalent readout or display of the pattern.

8 Claims, 4 Drawing Figures

APPARATUS AND METHOD TO EFFECT IR READING OF A RELIEF PATTERN

SUMMARY OF THE INVENTION

This invention relates generally to pattern recognition and in particular to an apparatus and method for reading product identification patterns, and more specifically to vehicle tire code identification.

In the manufacture of tires, identification of each tire is applied in the form of character patterns that are in relief to the tire sidewall surface. The patterns may be raised from the surface or impressed into the surface depending upon the requirements of the manufacturer. In either case, because the patterns are in relief and of the same material as the surrounding surface area, a lack of surface contrast makes reading of the pattern by automatic optical equipment extremely difficult.

Therefore, it is a primary object of this invention to provide a method and apparatus that effectively reads and identifies relief patterns.

Other objects and advantages of the invention will become apparent from the following description of the preferred embodiment and are accomplished in apparatus that, (a) rapidly heats the surface contact area of the relief pattern, (b) detects the infrared radiation emitted from the heated area, and (c) converts the infrared radiation to electrical equivalent signals indicative of the relief pattern for computer storage or display.

DESCRIPTION OF THE DRAWINGS

The features of the invention will be better understood from a consideration of the following description taken in conjunction with the accompanying drawings in which.

DESCRIPTION OF THE PREFERRED EMBODIMENT

Figures 1, 4:
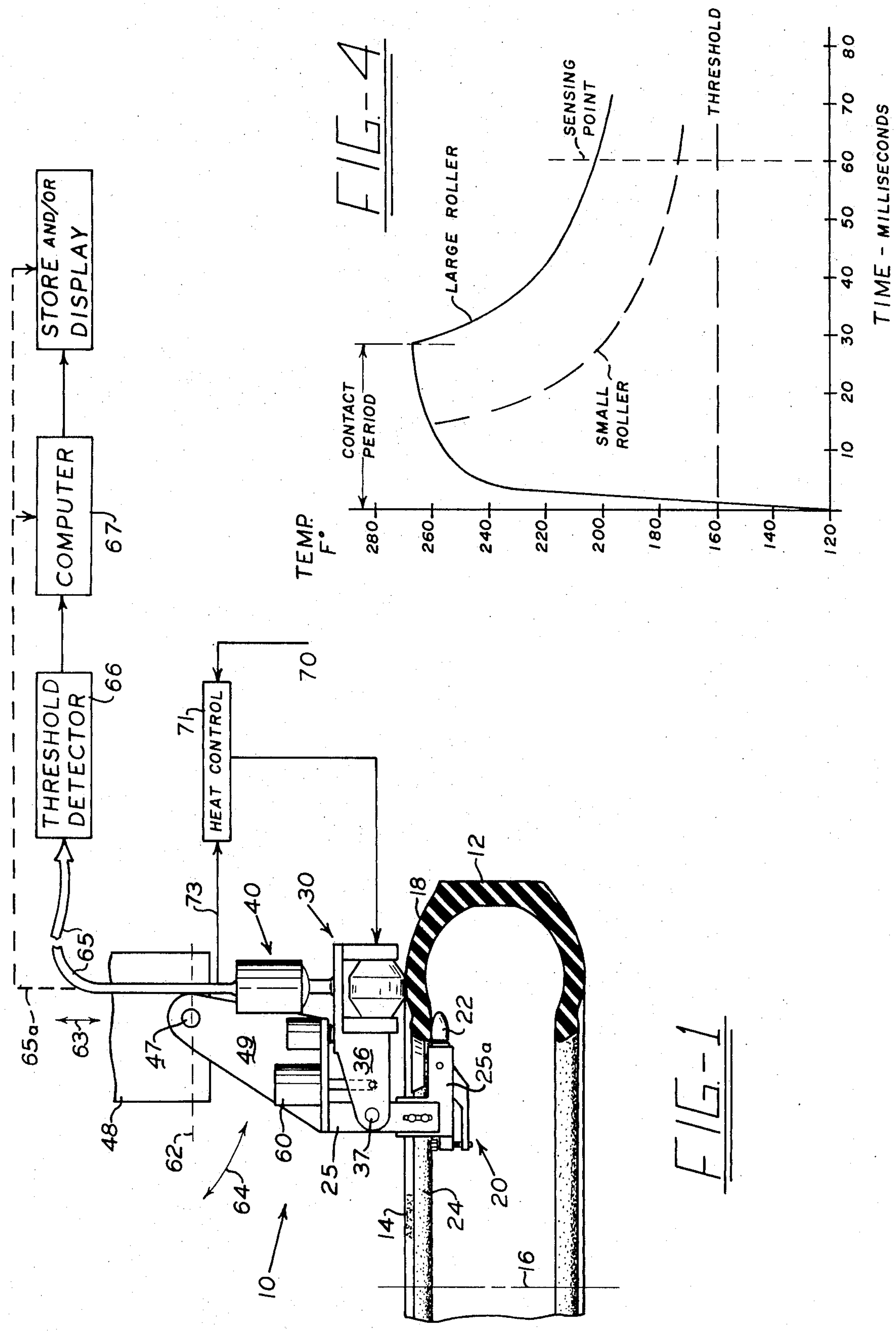
FIG. 1 is an elevational view partially broken away of the mechanical-optical apparatus and the associated electronics in block diagram representation.
FIG. 4 is a graphical representation of the surface temperature versus time plot of the operation of the invention.

In accordance with the invention, FIG. 1 illustrates a pattern reading apparatus generally indicated by numeral 10 in a position relative to a vehicle tire 12 having in relief thereon an identification code pattern 14. The peripheral equipment which may be used to position the article, in this case a tire, is not shown in the drawings inasmuch as this equipment may take many forms and as such is not considered part of the invention. In any event, the article on which the pattern is to be read is positioned in a manner consistent with the shape of the article to provide relative movement past the reading apparatus 10. As illustrated in FIG. 1 with respect to reading a tire identification code 14, the tire is positioned to rotate about its axis 16 such that the sidewall 18 is located in proximate position to the reading apparatus 10. In this application, the tire may be fed from a conveyor line on to a rotatably mounted table driven by a motor at a speed consistent with the apparatus 10, or the drive means may be a traction wheel butted against the tire tread and driven at the proper speed. Other arrangements for locating the article will become apparent and, therefore, the discussion will proceed with a description of the apparatus of the invention.

Figure 2:
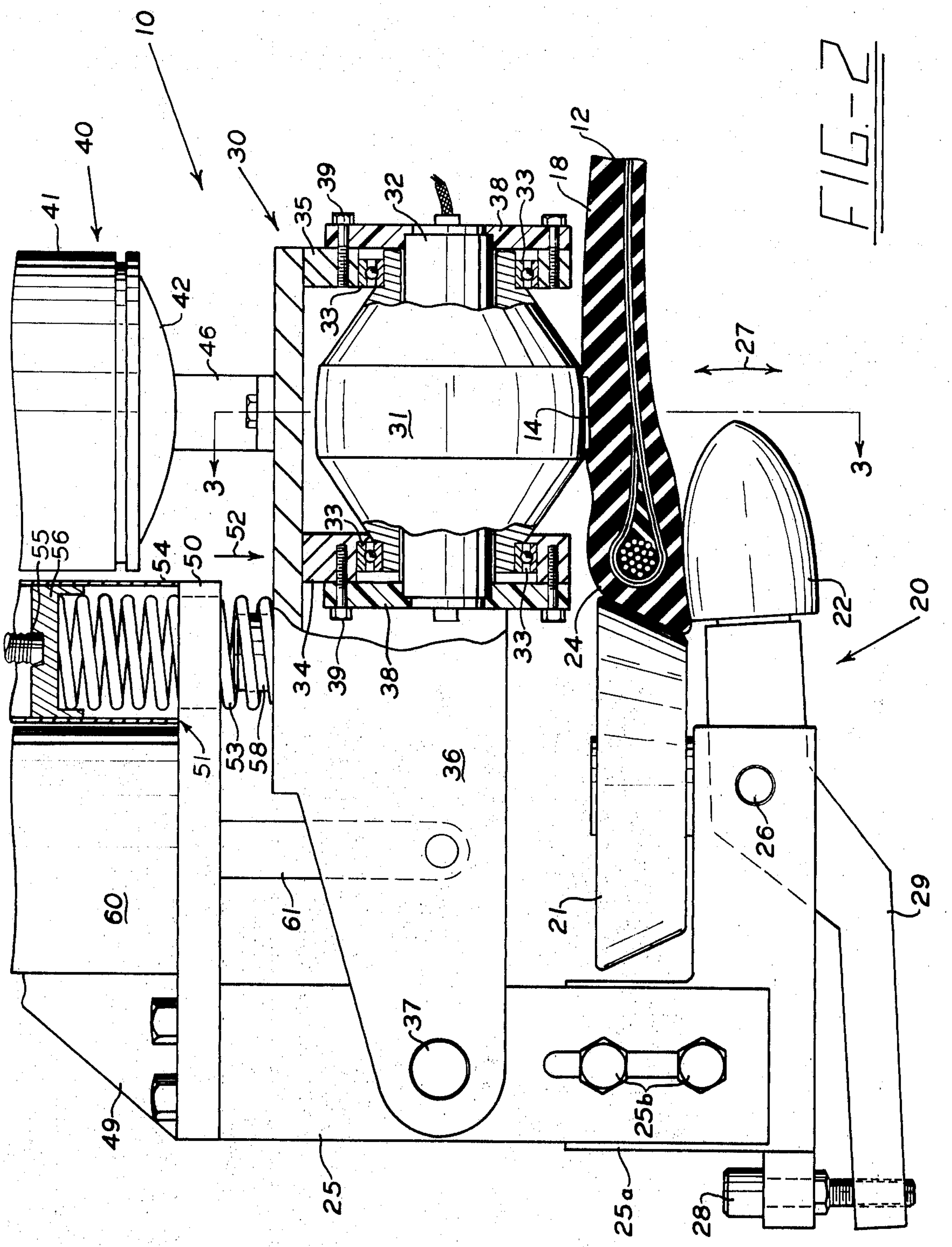
FIG. 2 is an enlarged view partially broken away of the apparatus of FIG. 1.
Figure 3:
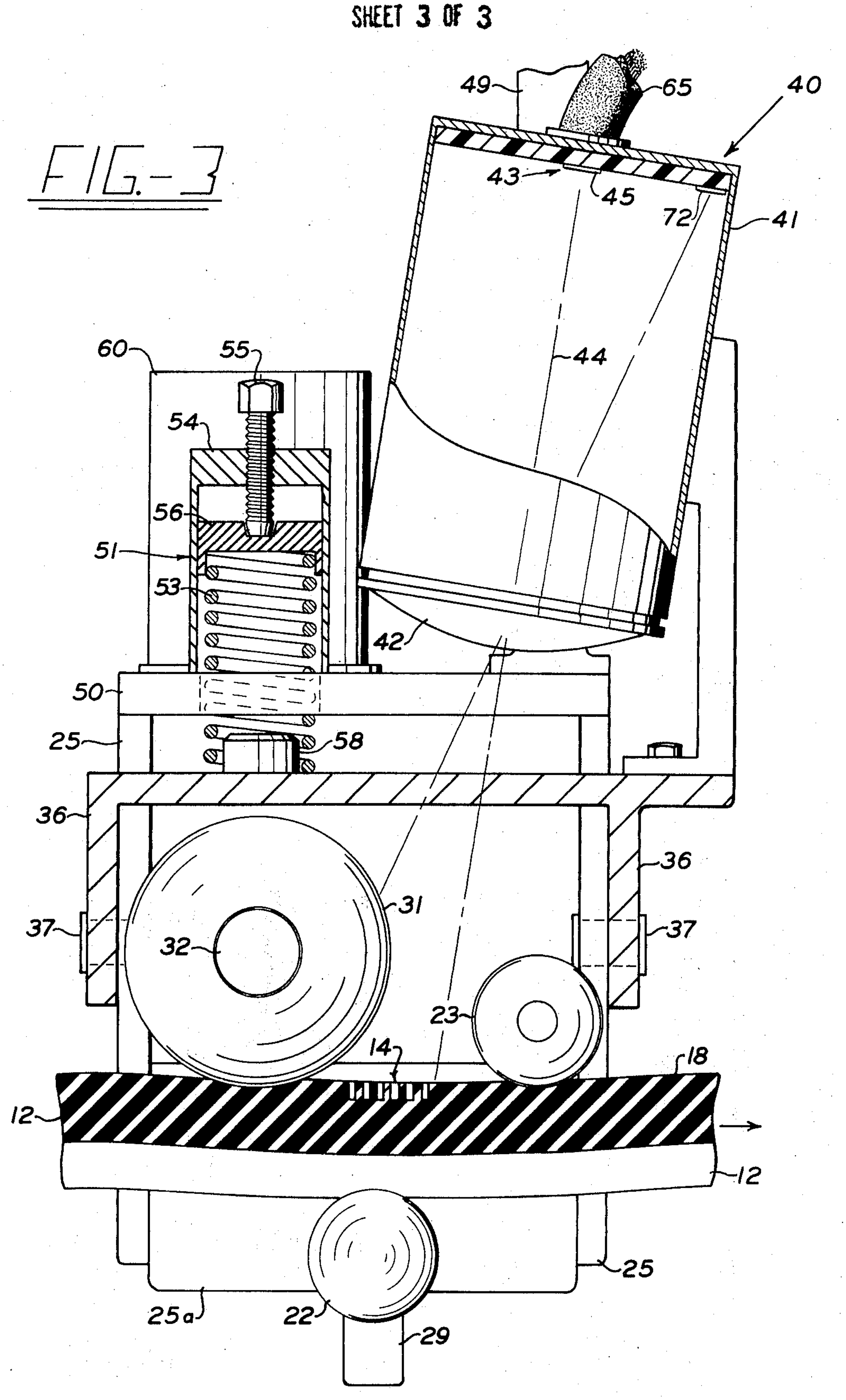
FIG. 3 is an elevational view taken on lines 3–3 of FIG. 2.

With reference to FIGS. 1, 2, and 3, the reading apparatus 10 comprises, (a) means generally indicated at 20 to position the reader relative to the tire sidewall 18 and the code 14, (b) means generally indicated at 30 to heat the sidewall surface of the tire in the area of the code 14, and (c) sensor means generally indicated at 40 to detect infrared radiation emitted from the tire sidewall 18.

More specifically, the positioning means 20 comprises rollers 21, 22, and 23 that engage the bead portion 24 of the tire 12.

Roller 21 is mounted to a subframe 25*a* of a main framework 25 to rotate in a substantially horizontal plane upon engagement with the bead of the rotating tire. Roller 22 is pivotably mounted to subframe 25*a* via pin 26 to pivot in a direction indicated at 27 to engage the inner portion of the tire bead 24. Adjustment is made by an adjusting screw 28 acting on a pivot arm 29. The subframe 25*a* is adjustable by reason of bolts 25*b* to move in a substantially vertical adjustment range. Roller 23 is mounted to a framework 36 of the heating means 30 and will be further described with respect to that unit.

The heating means 30 more specifically comprises a heated roller 31 having axially mounted therein a heating unit 32. The roller 31 is journalled in bearing sets 33 between two support members 34 and 35 fixedly attached to a pivotably mounted framework 36. The framework 36 is pivoted at 37 relative to the framework 25 of the apparatus 10. Attached via bolts 39 and to the outside of each member 34 and 35 is a pair of heat insulation plates 38.

The roller 23 is mounted to the framework 36 and pivoted therewith to engage the tire sidewall 18 in a position downstream from the heated roller 31 as the tire rotates through the reader apparatus 10. This roller, in combination with roller 31, provides stability to the tire sidewall as it is being read by the sensor means 40 as illustrated in FIG. 3. The roller 23 may be provided with cooling means to facilitate cooling of the tire sidewall surface for plural reading of a single identification code as will hereinafter be described with respect to the operation of the invention.

The sensor means 40 more specifically comprises a housing 41 having mounted therein a converging lens 42 and an array of infrared detection material 43 located at the focal point of the lens 42. Mounting of the sensor 40 is such that its axis 44 is centered on the area of the code pattern 14 as it passes under the heated roller 31. This area may be considered a code "window" which corresponds to the viewing area covered by the sensor and in which the pattern is located.

The infrared detector array 43 comprises a plurality of individual sensors or cells 45 arranged in a linear configuration and mounted such that the scan of the code window is accomplished by the tire motion with no requirement for scanning imposed on the sensing unit 40. The material for the array may be lead selenide (PbSe) having a response to IR radiation to 5 microns. Detectors of the type to meet the needs of the invention are available in the 1–5 micron wavelength from Santa Barbara Research Center, Goletta, California. The sensor unit 40 is fixedly mounted to a bracket or plate 46 that is attached to the frame 36 of the unit 30 and movable therewith around the pivot 37.

It should be understood that a single IR detector may be used in place of the linear array herebefore mentioned. Such single detector will meet the needs of the invention if a separate mechanism is arranged to provide the scanning requirements, and implementation of such an arrangement is considered equivalent and within the knowledge and skill of persons in the art.

The apparatus 10 has its frame 25 attached to a plate or bracket 49 that is pivotally mounted at 47 to an overhead member 48. The member 48 may be a stationary mounting but it is anticipated that it should be movable in the vertical direction to provide adapting the apparatus 10 to various size tires. Pivotable movement of the apparatus 10 around point 47 may be accomplished by a servo-motor (not shown) and the combination of vertical and arcuate movement will provide positioning of the apparatus relative to the tire bead 24 as will hereafter be described with respect to the operation of the invention.

Attached to a plate 50 that is fixed to the frame 25, is a spring mechanism 51 that acts to apply a downward force, indicated by arrow 52 in FIG. 2, to the roller mechanism 30 that is cantilevered by virtue of its pivot 37. The mechanism 51 comprises a spring 53 carried in a housing 54 and biased by a screw 55 acting on a piston 56. The spring 53 is located with respect to the roller unit 30 by a boss 58 attached to the frame 36 of the unit 30.

To provide retraction of the unit 30 from its operative position, a solenoid 60 is shown mounted to the plate 50 such that energizing of the solenoid retracts the movable member 61 with enough force to overcome the force of the spring 53 of unit 51 and to lift the roller mechanism 30.

In operation, the pattern reading apparatus 10 is vertically oriented with respect to a vehicle tire 12. The vertical distance is established by the pivot pin at 47 and is shown illustrated by the dashed line 62 passing through point 47. The movement in the vertical direction shown by arrow 63 may be accomplished by a servo-motor or any other means available to set and maintain the vertical height above a particular size tire. If the apparatus is to be applied to reading the code on a single size tire, then the vertical movement may be eliminated and the member 48 stationarily mounted. When the tire is positioned relative to the height 62 as herebefore mentioned, the reading apparatus 10 is pivoted downward along arc 64 such that the roller means 20 engages the bead portion 24 of the tire. The movement of the apparatus 10 around the pivot 47 may be accomplished by a servo-motor and actuated at the time when the vehicle tire 12 is in its position relative to the point 47.

Upon contact with the roller 21, the solenoid 60 is deactivated whereupon the heated roller 31 is moved into rolling contact with the tire sidewall 18 by virtue of the spring force 52 of mechanism 51. As the tire rotates about its axis 16, the heated roller 31 differentially heats the sidewall surface area containing the code pattern. In the case where the code 14 is impressed into the sidewall surface, the impressions forming the patterns are not heated to the same temperature level as the sidewall surface. As illustrated in FIG. 4 with respect to a particular roller speed, the temperature of the roller contact area of the tire sidewall surface rises rapidly while in contact with the roller 31 and drops off rapidly at about the 30 millisecond mark, when the roller contact ceases. The heat upon the surface contacted by roller 31 does not penetrate fast enough to the impressed depth of the pattern to raise the temperature of the impressions to the same level as the surface area. The impressed depth actually remains below the threshold temperature level indicated in the drawing, thus providing two levels of IR radiation which are used to describe the pattern.

The unit 40 containing the IR sensor array, scans the code "window" by reason of the tire rotation and detects the emitted IR radiation from the heated sidewall surface and outputs a plurality of signals indicative of the differential temperature across a line scan of the code "window".

The signals representative of the scan may be designated a binary "1" when the voltage level indicative of the detected temperature exceeds the voltage indicative of the threshold temperature shown in FIG. 4, and may be designated a binary "O" when the voltage level drops below the threshold, or vice versa. In any case, whatever the designation may be, the signals provide the means to recreate the pattern as read from the sidewall surface. These signals are sent via line 65 to a threshold detector circuit 66 that outputs binary signals, indicative of the detected temperature above or below the threshold value, to a computer 67 that compares them to a store of all the patterns comprising the identification code system according to well known techniques in the computer art. When a match is found, the identified pattern is stored in a register having a length of a standard code sequence. When all of the patterns of a sequence are stored, the register outputs the sequence to an additional storage means that may be used for inventory and/or quality control purposes. Display of the code pattern is another alternative and in this regard the full analog signal from the sensor 40 may be sent via line 65*a* directly to the computer 67.

If the characters of the code are in raised relief from the sidewall surface of the tire, they become heated by the roller 31 to a temperature above the threshold level. In this case, the otherwise enclosed surface area of the tire in the code window is not contacted by the roller 31 and remains at a temperature below the threshold. Similarly, two distinct levels of infrared radiation are detected by the sensor unit 40. In either case of raised or impressed characters, the heated portions of the surface may indicate a binary "1" or "O", depending on the computer preference.

As illustrated in FIG. 1, additional controls may be provided to (1) maintain proper temperature of the roller 31 and protect the article in the event of overheating due to a loss of relative motion between the article and the reader apparatus 10, and (2) to adjust or maintain the threshold level dependent upon various temperature conditions. For example, with presently known tire building materials, the sidewall surface temperature should not exceed about 280°F.

To protect the tire in the event of lost relative motion, a signal 70 from the tire rotating means may be fed to a heat control unit 71 to limit further heating of the unit 32. Alternatively, an additional IR sensor 72 may be oriented within the unit 40 as illustrated in FIG. 3, to provide a "hot" temperature indication from the heated roller 31 and send a signal 73 to the heat control unit 71 that may be adapted to maintain the heater unit 32 at a safe temperature level.

In addition, a cold surface sensor (not shown) may be mounted within the unit 40 at approximately 90° with respect to the hot surface sensor 72 to provide a signal indicative of the unheated surface. Both hot or cold temperature signals may be sent via line 65 to the threshold detector 66 to automatically adjust the threshold temperature level, indicated in FIG. 4, to a value consistent with any particular temperature environment.

As herebefore mentioned, roller 23 may be adapted to cool the tire sidewall surface to facilitate plural reading of the code window. This may be necessary in a situation where the reader 10 initially catches only a portion of the code pattern sequence upon its first engagement with the tire sidewall. In this circumstance, a full sequence will not be entered into the register and an additional revolution of the tire will be necessary. Therefore, the roller 23 may be adapted to carry a coolant to lower the sidewall temperature sufficient for an additional reading of the complete code sequence. In this case, the movement of the tires through the reader may be controlled by the computer such that a tire will not be switched out of the reading station until the register is fed a complete code sequence.

The invention may also be adapted to read the identification code on a "hot" tire as well. For example, a tire taken directly from a mold exhibits a particular temperature level. In this circumstance, the roller 31 may be adapted to cool the tire sidewall surface such that the IR radiation emitted is detectable in two temperature ranges as herebefore described.

These peripheral and additional controls are all within the knowledge and skill of persons in the art and various adaptations may be suggested dependent upon the application of the apparatus 10.

While only a single representative embodiment of the invention has been shown in detail and described, it will become apparent to those skilled in the art that various changes and modifications may be made therein without departing from the spirit or scope of the invention as covered by the appended claims.

What is claimed is:

1. Apparatus to effect reading of an identification relief pattern having raised and recessed portions and disposed in the elastomer of a vehicle tire surface comprising:

a. means contacting the raised portions of the relief pattern on the tire surface to effect by conduction, a temperature change in the raised portions of the inclosed pattern area sufficient to produce infrared radiation of a first energy level from the raised portions that is differentiated from a second energy level of infrared radiation from the recessed portions of the relief pattern;

b. sensor means in relative position to the tire surface inclosing the relief pattern and responsive to one of the two levels of the emitted radiation to provide an electrical output indicative of the relief pattern as exhibited in the two energy levels of the infrared radiation;

c. means to effect relative motion between the tire surface inclosing the relief pattern and the sensor means to provide scanning of the pattern; and d. means accepting the sensor means output to convert said output to an equivalent readout or display of the identification relief pattern.

2. Apparatus according to claim 1, wherein the means contacting the raised portions of the relief pattern is a heating means that raises the temperature of the surface occupied by the raised portions of the pattern.

3. Apparatus according to claim 1 wherein the sensor means comprises:

a. a linear cell array of material responsive to infrared radiation and disposed transverse to the direction of relative motion between the inclosed pattern on the tire and the sensor; and b. means to focus the radiation upon the linear cell array.

4. Apparatus according to claim 2, wherein a roller adapted to receive a coolant is mounted in a downstream position relative to the heating means and the sensor means to provide conduction cooling of the raised portions of the pattern surface for plural reading of the pattern.

5. Apparatus according to claim 1, wherein the means accepting the sensor means output is a threshold detector circuit to convert the signals indicative of the temperature of the raised portions of the pattern as reflected in the infrared energy emitted from the raised portions to a binary equivalent electrical signal indicative of the temperature above or below a threshold value.

6. Apparatus according to claim 5, further comprising a computer having a store of all tire identification patterns, which computer accepts the binary signals from the threshold detector circuit and compares said signals to its store of patterns to provide an output equivalent of the tire identification pattern.

7. A method of reading an identification relief pattern having raised and recessed portions and disposed in the elastomer of a vehicle tire surface comprising the steps of:

1. heating the raised portions of the inclosed pattern area by conduction sufficient to provide detectable infrared radiation of a first energy level from the raised portions that may be differentiated from the radiation energy of a second level from the recessed portions of the pattern;
2. scanning the inclosed pattern area with a radiation sensor responsive to the energy level of the raised portions of the pattern to provide a radiation image representative of the temperature difference between the pattern in raised relief and the inclosed surface area;
3. converting the radiation image to an electrical equivalent indicative of the identification pattern; and
4. comparing the electrical equivalent of the identification relief pattern to the computer store of patterns to provide an exact readout or display of the pattern as read from the tire when a match is found.

8. The method of claim 7, wherein the relief pattern is in the elastomer of a hot molded vehicle tire and the raised portions of the pattern are cooled by conduction, and scanning the inclosed pattern area with a radiation sensor provides a radiation image representative of the temperature difference between the cooled portions of the pattern in raised relief and the inclosed pattern area.

* * * * *